(12) United States Patent
Liang et al.

(10) Patent No.: US 9,235,621 B2
(45) Date of Patent: Jan. 12, 2016

(54) DATA-AWARE SCALABLE PARALLEL EXECUTION OF ROLLUP OPERATIONS

(71) Applicant: Oracle International Corporation, Redwood Shores, CA (US)

(72) Inventors: Jianhua Liang, San Diego, CA (US); Srikanth Bellamkonda, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 365 days.

(21) Appl. No.: 13/754,770

(22) Filed: Jan. 30, 2013

(65) Prior Publication Data
US 2014/0214800 A1    Jul. 31, 2014

(51) Int. Cl.
G06F 7/00      (2006.01)
G06F 17/30     (2006.01)

(52) U.S. Cl.
CPC .... *G06F 17/30483* (2013.01); *G06F 17/30445* (2013.01)

(58) Field of Classification Search
CPC ................... G06F 17/30445; G06F 17/30483; G06F 2201/80
USPC .......................................... 707/713, 764, 769
See application file for complete search history.

(56) References Cited

U.S. PATENT DOCUMENTS

| 6,775,682 | B1 * | 8/2004 | Ballamkonda et al. | 707/999.102 |
| 7,035,843 | B1 * | 4/2006 | Bellamkonda et al. | 707/999.003 |
| 7,143,107 | B1 * | 11/2006 | Nebres, Jr. | 707/603 |
| 7,725,455 | B1 * | 5/2010 | Shatdal | 707/713 |
| 8,140,516 | B2 * | 3/2012 | Bhattacharjee et al. | 707/713 |
| 8,868,544 | B2 * | 10/2014 | Witkowski et al. | 707/713 |
| 8,892,502 | B2 * | 11/2014 | Hermann et al. | 707/600 |

OTHER PUBLICATIONS

Chen et al., International Conference on Data Engineering, 2008, ICDE, IEEE 24th, pp. 218-227.*
Chen et al., SIGMOD 2005 Jun. 14-16, 2005, Baltimore, Maryland, USA, pp. 263-274.*

\* cited by examiner

*Primary Examiner* — Cheyne D Ly
(74) *Attorney, Agent, or Firm* — Hickman Palermo Becker Bingham LLP

(57) ABSTRACT

According to one aspect of the invention, for a database statement that specifies rollup operations, a data distribution key may be selected among a plurality of candidate keys. Numbers of distinct values of the candidate keys may be monitored with respect to a particular set of rows. Hash values may also be generated by column values in the candidate keys. The data distribution key may be determined based on results of monitoring the numbers of distinct values of the candidate keys as well as the frequencies of hash values computed based on column values of the candidate keys. Rollup operations may be shared between different stages of parallel executing processes and data may be distributed between the different stages of parallel executing processes based on the selected data distribution key.

20 Claims, 6 Drawing Sheets

DATA-AWARE SCALABLE PARALLEL EXECUTION OF ROLLUP OPERATIONS

TECHNICAL FIELD

The present invention relates to relational database management systems and, more specifically, to techniques for performing rollup operations in a relational database management system.

BACKGROUND

In a relational database context, rollup operations can be performed against a given set of rows. The rollup operations can be specified in a database statement. For example, specifying a ROLLUP keyword in a GROUP BY clause of an SQL SELECT statement causes performing two or more group-by operations as a part of executing the SQL SELECT statement. The rollup operations generate multiple levels of subtotals based on a list of rollup columns specified in the database statement. The multiple levels of subtotals generated by the rollup operations can range from the most detailed level to a grand total from all rows used to evaluate these subtotals.

Rollup operations are frequently used for analyzing data sets. For example, rollup operations may be used to extract information on sales data stored in a database system. This information can be utilized by a company to track sales, evaluate policy, develop marketing strategy, project future growth, and perform various other tasks.

Given the importance of rollup operations for data analysis, providing a quick result for database queries specifying rollup operations is often an important database performance metric.

Based on the foregoing, there is a need for developing techniques that can perform rollup operations in a highly efficient and scalable fashion.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
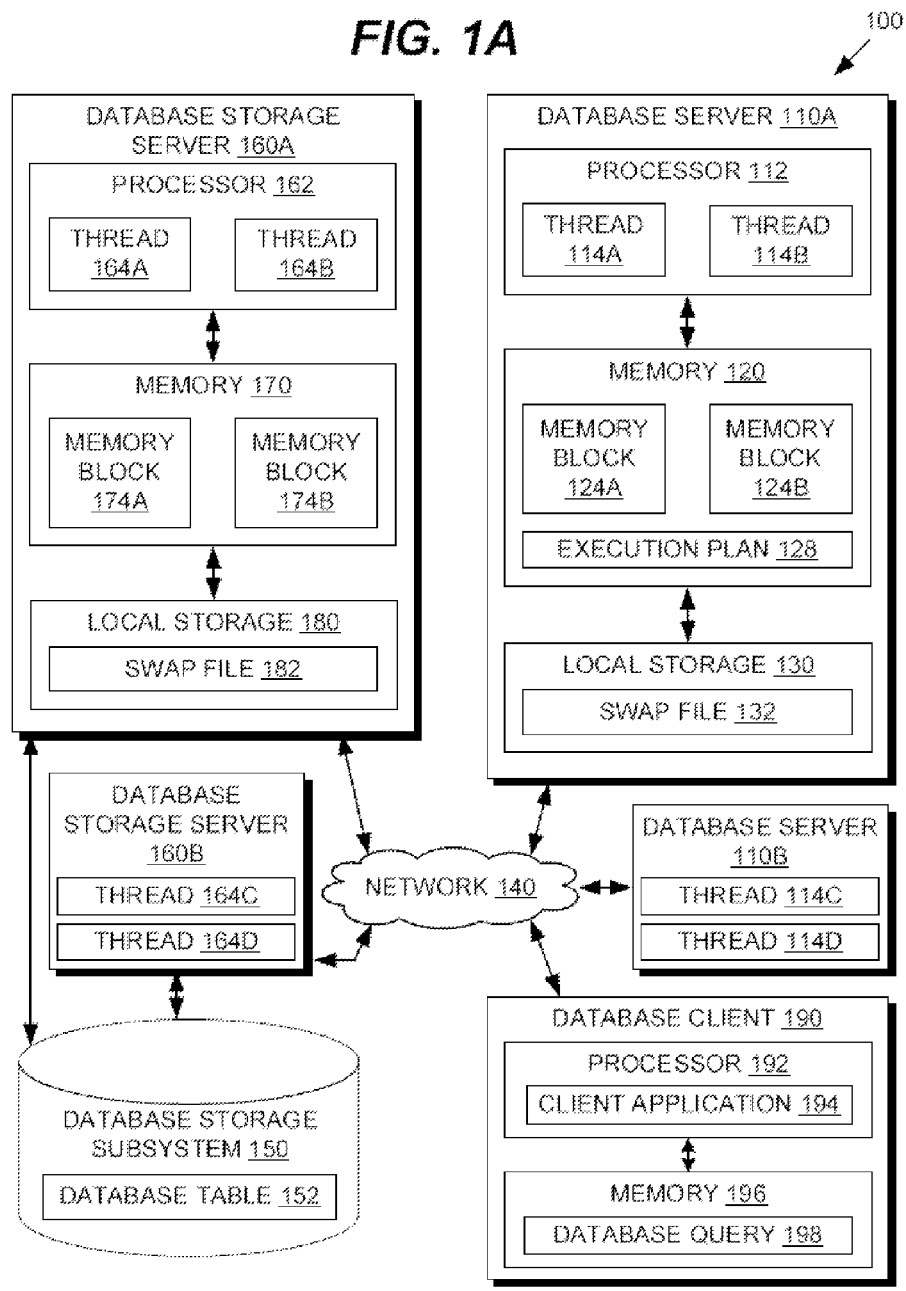
FIG. 1A is a block diagram that depicts an exemplary database system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Definitions

A "computing node", as the term is used herein, refers to a set of one or more processes (under control of an operating system) and a portion of memory and/or other computer resources, that are allocated for performance of one or more functionalities pursuant execution of software by said one or more processes. A computing node is also referred to herein as a node. A node includes a "server" or "server instance" that is configured to respond to requests from various clients and applications for one or more services and/or functionalities.

Examples of nodes include without limitation database servers that manage data in one or more databases, storage devices that store data persistently for database servers, multimedia server instances that manage various types of multimedia such as images, audio/video streams, and other streamed multimedia content, internet server instances that cache content that is persistently stored elsewhere, application server instances and other types of middleware server instances that cache data to service particular types of clients and applications, and any other types of instances that are configured to process persistently stored data by buffering it into a volatile memory cache.

An "execution plan" or "query execution plan", as the term is used herein, refers to a set of steps that are generated by a database system to execute a database statement such as a query, etc. Several candidate execution plans may be generated for a particular statement, and a candidate execution plan estimated to be most efficient may be selected as the actual execution plan. The selection of an optimal candidate execution plan is beyond the scope of the present application and the selection of an efficient candidate execution plan will be assumed.

An execution plan may be represented by a tree data structure of interlinked nodes, referred to herein as "operators", each of which corresponds to a step of an execution plan, referred to herein as an execution plan operation. The hierarchy of the tree represents the order in which the execution plan operations are performed and how data flows between each of the execution plan operations. Execution plan operations include, for example, an aggregation, a sort, a table scan, an index scan, hash-join, sort-merge join, nested-loop join, and filter.

A "record source", as the term is used herein, refers to an operator that when executed produces a set of rows, for example by scanning the rows of a database table, or by performing an operation, such as a table join, on one or more inputs to create a new set of intermediate records. When a record source is defined for a particular operator, such as for an aggregation operator, a consumer process, etc., then the record source is defined as an input for that particular operator.

When data is stored in a relational database system, applications access the data by submitting commands that conform to the database language supported by the relational database system. The most common database language is the Structured Query Language (SQL).

Relational database systems store data in the form of related tables, where each table has one or more columns and zero or more rows. A relational database management system may organize data in the tables in disk blocks (or data blocks) on disk. A "disk block" is a logical unit of data storage used by a relational database management system for storing database data. A disk block has a block size (e.g., 4 KB) and may encompass one or more underlying file system or operating system blocks. Among other information, a disk block may include the data of one or more rows of a table or tables, or the data of a row may span multiple disk blocks.

General Overview

A database statement may specify rollup operations. A list of one or more rollup columns can be specified after the keyword "ROLLUP" in a "GROUP BY" clause of an SQL statement. Zero or more non-rollup columns can be specified before the keyword "ROLLUP" in the same clause. The non-rollup columns and rollup columns together form an ordered list of group-by columns, as ordered from the rightmost column (the lowest level) to the leftmost column (the highest level). It should be noted that while the rollup columns are ordered, the non-rollup columns are not necessarily ordered in all embodiments, although the implementation may simply use the original order as specified in the statement for ordering the non-rollup columns. The rollup operations create progressively higher-level subtotals, moving from right (the lowest level) to left (the highest level) through the list of rollup columns.

Some parallel execution schemes for performing rollup operations may not scale well. These schemes use a data distribution key comprising only non-rollup columns to distribute input data to multiple processes executing in parallel. The data distribution key has a number of distinct values that may be used to distribute input data to different processes among parallel executing processes. The number of distinct values of the data distribution key determines the number of possible parallel executing processes that can be used to perform rollup operations. As used herein, the term "process" may refer to any processing entity including an operating process, a thread, a light weight process, a database server, an operator that performs one or more database related operations, etc.

When a data distribution key comprising only non-rollup columns has a low number of distinct values of the non-rollup columns, the number of possible parallel executing processes is also low.

For example, a database system may have hundreds, thousands, or more potential parallel executing processes available for parallel execution. A database statement may specify a "year" column in a table "sales" as the only non-rollup key in a "GROUP BY" clause. A data distribution key that comprises the non-rollup column (the "year" column) might have only two distinct values (e.g., "Y1" and "Y2"). As a result, only two parallel executing processes could be used to receive input data to perform rollup operations.

Furthermore, numbers of rows having the distinct values of the data distribution key may be skewed. For example, the number of rows having the distinct value "Y1" may be much greater than the number of rows having the distinct value "Y2". As a result, one or more parallel executing processes may be heavily overloaded relative to other parallel executing processes.

Some parallel execution schemes use a data distribution key that comprises all group-by columns—including both rollup columns and non-rollup columns. Since the data distribution key comprises more columns than the approach previously discussed, a large number of distinct values of the data distribution key may be available. For almost all of the rollup levels, a parallel executing process may only have partial data partially with their respective ranges of distinct values of the distribution key and can only partially perform rollup operations for these levels. Consolidation processes can be used to receive and consolidate the partial results. The partial results may be stored in generated rows that store partial subtotals at each of progressively higher-level subtotals for the rollup operations and transmitted between a first set of parallel executing processes generating the partial results and a second set of parallel executing processes consolidating the partial results.

When input data is sparsely distributed among distinct values of the data distribution key, subtotals from the lowest level to the highest level may all come from a single (input) row. Each input row may cause multiple rows to be generated to store partial results for multiple rollup levels and to be distributed from the first set of processes to the second set of processes. For example, if the number of rollup levels is four e.g., ROLLUP (year, quarter, month), each input row may cause four rows to be generated to store subtotals of the four rollup levels. A large number of input rows may lead to an even larger numbers of generated rows that contain results of partially performed rollup operations, causing a data explosion which may overload distribution channels between the first set of processes and the second set of processes.

To overcome scalability issues associated with low cardinality of non-rollup columns and data explosion of sparsely distributed input data, a data-aware parallel execution scheme may be used to perform rollup operations. Under this approach, a data distribution key to be used for distributing data between multiple rollup distributors and multiple rollup collectors is dynamically selected from a plurality of candidate data distribution keys based on monitoring distinct values of these candidate data distribution keys. The candidate data distribution keys can range from comprising only non-rollup columns to comprising all group-by columns including both non-rollup columns and rollup columns. For example, in a database statement with a "GROUP BY year, ROLLUP (quarter, month, day)" clause, the candidate data distribution keys are as follows (from the highest level to the lowest level): (1) year (only the non-rollup column), (2) year and quarter, (3) year, quarter and month, and (4) year, quarter, month and day (all group-by columns).

Rollup operations can be partitioned between parallel (or concurrently) executing rollup distributors and collectors based on the specific columns included in the dynamically selected data distribution key. Subtotals at levels represented by the specific columns in the key or fewer are locally computed by the rollup distributors based on the rollup distributors' respective local input data and then the partially aggregated results are consolidated by the rollup collectors, while subtotals at levels represented by more columns than the specific columns in the key are globally computed by the rollup collectors.

In some embodiments, the rollup distributors receive input data from corresponding group-by operators. In some embodiments, a rollup distributor and a corresponding group-by operator run in the same process while rollup collectors run on another set of parallel executing processes. The input data from the corresponding group-by operators may be compressed beforehand by the group-by operators. For example, a group-by operator may receive multiple rows with the same values of the ordered list of group-by columns at the base level. Since all subsequent rollup operations are either at or above the base level, the multiple rows with the same values of the ordered list of group-by columns may be safely compressed into a single input row with the same values of the ordered list of group-by columns, without causing any loss of information for the subsequent rollup operations.

The compression operation may involve hashing or sorting, which can be expensive (especially with sorting) and even futile if the input data is sparsely distributed at the base level and thus cannot be much compressed. The group-by operators adaptively avoid computation overheads by monitoring frequencies of combinational values of columns at the base level of the input rows and changing to pass-through operators upon determining that the frequencies are too low as compared with some threshold values. As pass-through operators, the group-by operators simply output the input rows to their respective rollup producers without compressing the input rows. It should be noted that a rollup distributor/collector may play a role of consumer to a precedent operator or process and a role of a producer to a subsequent operator or process.

System Overview

FIG. 1A is a block diagram that depicts an exemplary database system, according to an embodiment. Database system 100 of FIG. 1A includes database server 110A, database server 110B, network 140, database storage subsystem 150, database storage server 160A, database storage server 160B, and database client 190. Database server 110A includes processor 112, memory 120, and local storage 130. Processor 112 includes threads 114A and 114B. Memory 120 includes memory block 124A, memory block 124B, and execution plan 128. Local storage 130 includes swap file 132. Database server 110B includes thread 114C and thread 114D. Database storage subsystem 150 includes database table 152. Database storage server 160A includes processor 162, memory 170, and local storage 180. Processor 162 includes thread 164A and thread 164B. Memory 170 includes memory block 174A and memory block 174B. Local storage 180 includes swap file 182. Database storage server 160B includes thread 164C and thread 164D.

Database servers 110A-110B and database storage servers 160A-160B are multi-node systems, each comprising any multiple number of nodes. Threads 114A-114B may be referred to as consumers, whereas threads 164A-164B may be referred to as producers. Each thread may be configured as a node assigned to execute a particular operator of a query execution plan. Multiple nodes may be assigned to the same operator, which may also execute in parallel on multiple computing devices. Embodiments of the present invention are illustrated using multi-node systems, however an embodiment of the present invention is not so limited. In some embodiments, the producers and consumers are not limited to be on different servers. They may reside on the same server(s).

While only a single database client 190 is shown, embodiments of database system 100 may support multiple database clients concurrently. Additionally, while only a single database table 152 is shown in database storage subsystem 150, embodiments may also include multiple database tables, and database statement 198 may address multiple database tables in a single query. Embodiments of database system 100 may also include any desired quantity of database servers, database storage servers, and database storage subsystems. For simplicity, database server 110B and database storage server 160B are shown in abbreviated form in FIG. 1A. However, database server 110B may contain elements similar to those shown in database server 110A, and database storage server 160B may contain elements similar to those shown in database storage server 160A.

Client application 194 executing on processor 192 of database client 190 may be directed towards various database applications including web services, data transactions, data mining, high-performance computing (HPC), and other applications. A database statement 198 may be generated at client application 194 as a SQL query for execution on database table 152, and the query may be routed to an available database server, such as database server 110A. In response, database server 110A may generate a corresponding execution plan 128, which may be executed in parallel over available threads on database storage servers 160A-160B and database servers 110A-110B. As shown in database system 110, each thread 114A, 114B, 164A, and 164B may allocate a corresponding memory block 124A, 124B, 174A, and 174B, respectively. If insufficient memory is available, then virtual memory may be utilized via swap files 132 and 182 of local storage 130 and 180, respectively. However, as discussed below, execution plan 128 may be structured to avoid swapping to local storage.

Rollup Operations

A database statement can specify rollup operations with a "GROUP BY" clause as follows:

GROUP BY [expr1, . . . ] ROLLUP (expr2 [, expr3, . . . ])

As can be see above, zero or more non-rollup columns (e.g., "expr1", etc.) can be specified outside rollup specification. One or more rollup columns (e.g., "expr2", "expr3", etc.) can be specified after the keyword "ROLLUP" within rollup specification. The non-rollup columns and the rollup columns together form an ordered list of group-by columns from the rightmost column (the lowest order) to the leftmost column of the rollup keys (the highest order). It should be noted that while the rollup columns are ordered, the non-rollup columns are not necessarily ordered in all embodiments, although the implementation may simply use the original order as specified in the statement for ordering the non-rollup columns. When at least one non-rollup column exists, the rollup operations are partial rollup operations (e.g., rollup stops at the rightmost non-rollup key). When no non-rollup column exists, rollup operations are full rollup operations.

Example database statements respectively specifying full rollup operations and partial rollup operations are shown in the following expressions:

SELECT year, quarter, month, day, sales

FROM sales

GROUP BY ROLLUP (year, quarter, month, day);  (1)

where the rollup levels computed are (year, quarter, month, day), (year, quarter, month), (year, quarter), (year) and (grand-total).

SELECT year, quarter, month, day, sales

FROM sales

GROUP BY year ROLLUP (quarter, month, day);  (2)

where the rollup levels computed are (year, quarter, month, day), (year, quarter, month), (year, quarter) and (year).

The above database statements have the same ordered list of group-by columns: year, quarter, month and day, but have different lists of rollup columns. The database statement in expression (1) specifies a list of rollup columns comprising year, quarter, month, and day. The database statement in expression (2) specifies a list of rollup columns comprising quarter, month, and day.

Parallelization Based on Non-Rollup Columns

For a database statement (e.g., expression (2)) that specifies partial rollup operations, a simple way of parallelizing execution of such a database statement would be to use one or more non-rollup columns as a data distribution key.

Figure 2A:
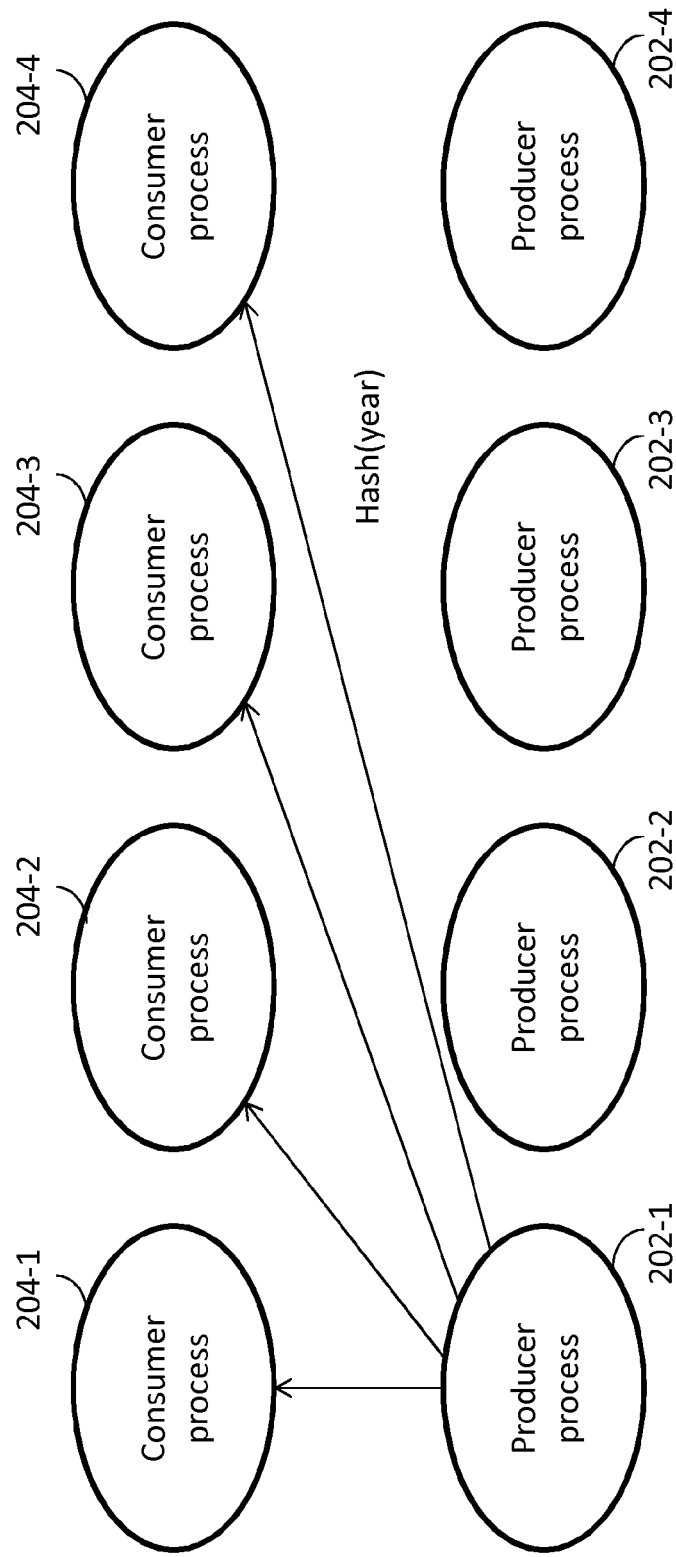
FIG. 2A, FIG. 2B and FIG. 2C illustrate example execution strategies of a database statement.

As illustrated in FIG. 2A, each of a plurality of producer processes (202-1 through 202-4) may be assigned the task to retrieve (input) rows or records from a size-comparable portion of data blocks in a database table and distribute the retrieved rows to respective consumer processes based on distinct values of the distribution key comprising the non-rollup columns as indicated in database values of the retrieved rows. A producer process may use a function (e.g., a hash function) that takes a value of the distribution key comprising the non-rollup columns indicated by database values of an input row as input and returns the identity of a corresponding consumer process to which the input row should be sent or distributed.

Consumer processes receive their respective subsets of rows and perform the group-by operation and partial rollup operations specified in the database statement. Since all rows in a particular subset of rows received by a particular consumer process share the same unique combination of key values of the distribution key comprising the non-rollup columns, the particular consumer process can calculate globally complete subtotals at multiple rollup levels based on the particular subset of rows, independent of other consumer processes. The other consumer processes can concurrently and independently calculate globally complete subtotals at the multiple rollup levels based on other subsets of rows that do not share the same combination of key values of the distribution key comprising the non-rollup columns as the particular subset of rows.

For example, data distribution made to a plurality of consumer processes (e.g., 204-1 through 204-4 of FIG. 2A) may be based on a distribution key comprising the "year" column (the only non-rollup column in expression (2)). A consumer process that receives a subset of rows that share the same key value (e.g., "Y1" of the "year" column) can proceed to compute globally complete subtotals of the multiple levels (a. year; b. year and quarter; c. year, quarter and month; and d. year, quarter, month and day) independent of other consumer processes that receive other subsets of rows (for other years "Y2", etc.) that do not share the same key value ("Y1") of the "year" column.

This parallel execution model works well when the number of subsets of rows, as created based on distinct values of a distribution key comprising non-rollup columns, is sufficiently large to satisfy one or more criteria relating to a desired degree of parallelism (DOP) or some other types of parallelism parameters.

However, there are a number of disadvantages associated with this parallelization execution model. First, if the number of distinct values of the distribution key comprising only non-rollup columns is low, the number of consumer processes is limited accordingly. Second, if data is skewed such that disproportionate amounts of input data are associated with one or more particular distinct values of the data distribution key comprising only non-rollup columns, one or more consumer processes may be overloaded while the other consumer processes may be lightly loaded, thereby causing slow responses and wastes of processing resources.

Parallelization Based on Group-by Columns

To ameliorate scalability problems associated with low cardinality of a distribution key comprising non-rollup columns, a data distribution key comprising all group-by columns including not just rollup columns but also all non-rollup columns if exist as specified in a database statement (e.g., expression (1), expression (2), etc.) can be used for data distribution between parallel executing consumer processes and producer processes.

Figure 2B:
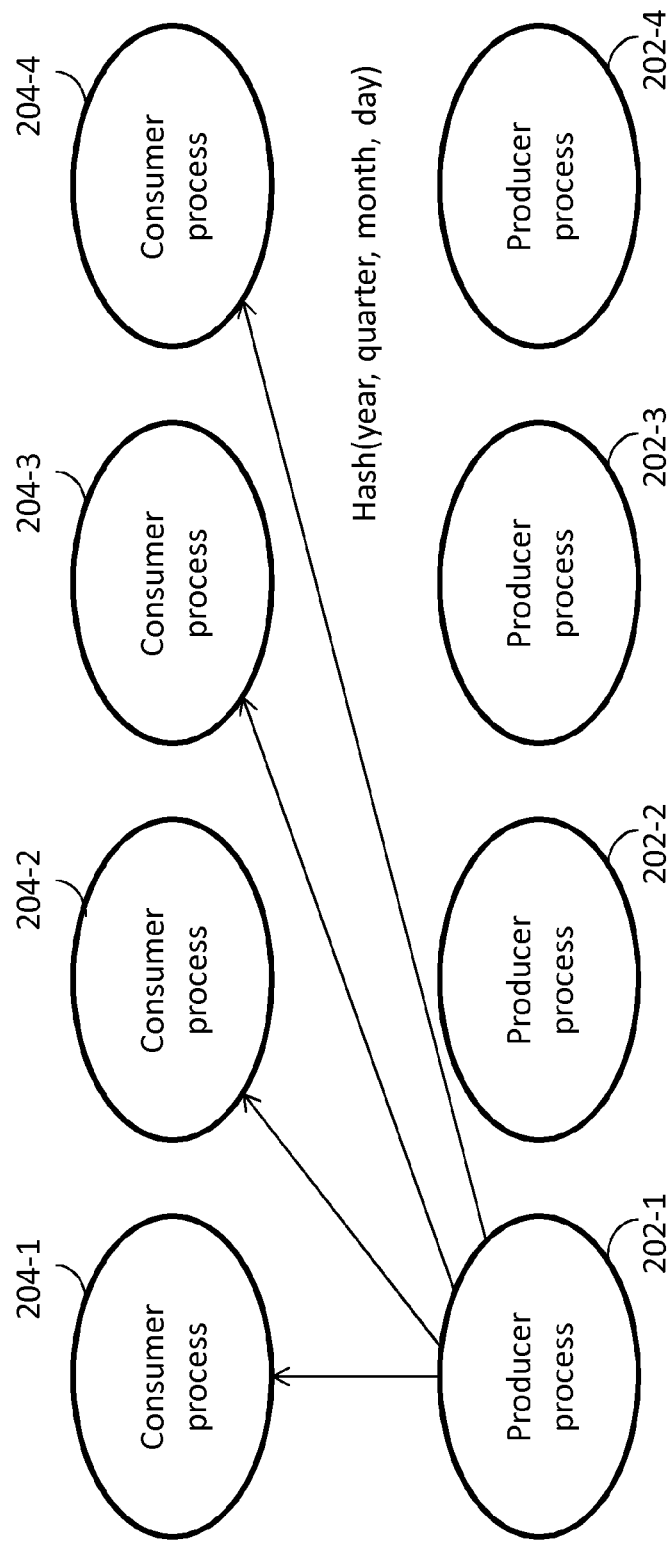

As illustrated in FIG. 2B, each of a plurality of producer processes (202-1 through 202-4) may be assigned the task to retrieve (input) rows or records from a size-comparable portion of data blocks in a database table, calculate local subtotals of all rollup levels based on a respective subset of input data or rows, and distribute the local subtotals to respective consumer processes (204-1 through 204-4) based on distinct values of the distribution key which includes all group-by keys, of input data or rows in the respective subset of input data or rows.

This approach has the drawback of data traffic explosion when input data is sparse (e.g., input rows have low frequencies or low repetition in a large number of distinct data distribution key values), which is not so uncommon in data warehousing applications. Rows generated to store local subtotals of multiple levels and other information associated with the subtotals may be much more numerous than the number of input rows in some data scenarios. Data traffic containing local subtotals from the producer processes to the consumer processes can be very large.

For the purpose of illustration, to evaluate a database statement as illustrated in expression (2), a producer process (e.g., 202-1) in a plurality of producer processes (e.g., 202-1 through 202-4) receives a subset of input rows as shown in the following table:

TABLE 1

| year | quarter | month | Day | sales |
|------|---------|-------|-----|-------|
| Y1 | Q1 | M1 | D1 | 30 |
| Y2 | Q2 | M4 | D2 | 30 |
| Y3 | Q3 | M7 | D3 | 40 |
| Y4 | Q4 | M10 | D4 | 40 |

The producer process (202-1) computes local subtotals of multiple rollup levels and generates rows, which are to be distributed to a plurality of consumer processes (202-1 through 202-4), with the local subtotals as shown in the following table:

TABLE 2

| year | quarter | month | Day | sales |
|------|---------|-------|-----|-------|
| Y1 | Q1 | M1 | D1 | 30 |
| Y1 | Q1 | M1 | null | 30 |
| Y1 | Q1 | Null | null | 30 |
| Y1 | null | Null | null | 30 |
| Y2 | Q2 | M4 | D2 | 30 |
| Y2 | Q2 | M4 | null | 30 |
| Y2 | Q2 | Null | null | 30 |
| Y2 | null | Null | null | 30 |
| Y3 | Q3 | M7 | D3 | 40 |
| Y3 | Q3 | M7 | null | 40 |
| Y3 | Q3 | Null | null | 40 |
| Y3 | null | Null | null | 40 |
| Y4 | Q4 | M10 | D4 | 40 |
| Y4 | Q4 | M10 | null | 40 |
| Y4 | Q4 | Null | null | 40 |
| Y4 | null | Null | null | 40 |

As can be seen above, as compared with the number of rows in the subset of rows processed by the producer process (202-1), the data traffic to be distributed from the producer process (202-1) to the consumer processes (204-1 through 204-4) increases four folds. Similarly, other producer processes (e.g., 202-2, etc.) may also generate rows to store their respective local subtotals for their respective sparse date. As a result, the parallel execution model based on all group-by columns can cause data explosion between parallel executing processes.

Data-Aware Scalable Parallel Execution

Figure 2C:
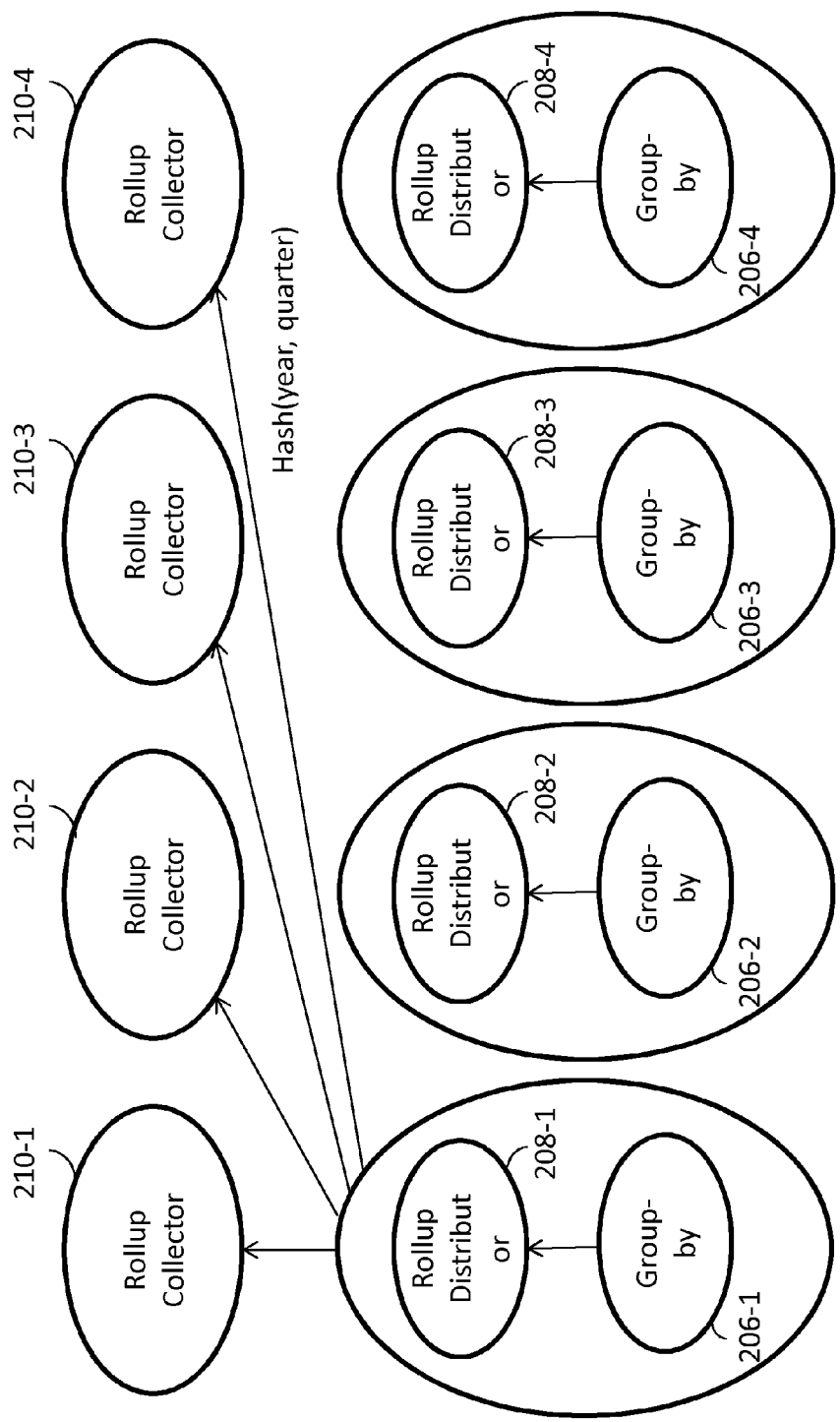

Data-aware parallelization execution techniques as described herein avoid the limitations of other schemes and provide an efficient parallel execution scheme that dynamically adapts to characteristics of input data as discovered at runtime. As illustrated in FIG. 2C, three stages (or phases) may be used to implement this parallel execution scheme.

First Stage

Each of a plurality of group-by operators (206-1 through 206-4) may be assigned to retrieve (input) rows or records from a respective number of data blocks in a database table. Each (e.g., 206-1, 206-2, etc.) of the plurality of group-by operators may be configured to compress input rows. A group-by operator can calculate subtotals at the base level (the most detailed level; the group-by level; for example, year, quarter, month and day for expressions (1) and (2)) based on the group-by operator's input rows, store the subtotals of the base level into a smaller number of rows, and passing the smaller number of rows to a corresponding rollup distributor running on the same process (e.g., 208-1 for 206-1, 208-2 for 206-2, etc.).

Calculating subtotals at the base levels for the purpose of compressing input rows may consume additional CPU time and memory usage. Thus, each of the plurality of group-by operators (206-1 through 206-4) can be configured to adaptively determine whether to compress the input rows. In an embodiment, a group-by operator is configured to monitor frequencies of distinct combinations of values of the group-by columns in input rows. If a relatively high percentage (which may be configured manually, programmatically, by default, etc.) such as 10 percentiles, 30 percentiles, 50 percentiles, 70 percentiles, a smaller/larger percentiles, etc., of unique rows (in terms of the columns of the group-by columns) is found in the input rows, the group-by operator may be configured to avoid/abandon compressing the input rows and to simply pass the input rows without compression to a corresponding rollup distributor. Additionally, optionally, or alternatively, if a relatively high percentage (which may be configured manually, programmatically, by default, etc.) such as 10 percentiles, 30 percentiles, 50 percentiles, 70 percentiles, a smaller/larger percentiles, etc., of repetitive rows (in terms of the columns of the group-by columns) is found in the input rows, the group-by operator may be configured to start compressing the input rows and to pass compressed input rows to a corresponding rollup distributor.

In a first example, a group-by operator (e.g., 206-1) may receive uncompressed input

TABLE 3

| year | quarter | month | day | Sale |
|------|---------|-------|-----|------|
| Y1   | Q1      | M1    | D1  | 10   |
| Y1   | Q1      | M1    | D1  | 20   |
| Y1   | Q1      | M1    | D1  | 30   |
| Y2   | Q2      | M4    | D4  | 40   |

The group-by operator (206-1) monitors the frequencies of distinct values at the base level (year, quarter, month and day) and determines (e.g., based on frequency-related threshold values) that the uncompressed input data can be compressed into a smaller set of rows at the base level as follows:

TABLE 4

| year | quarter | month | day | sale |
|------|---------|-------|-----|------|
| Y1   | Q1      | M1    | D1  | 60   |
| Y2   | Q2      | M4    | D4  | 40   |

Instead of sending the four rows in TABLE 3, the group-by operator (206-1) sends only two rows as shown in TABLE 4 to its corresponding rollup distributor (208-1).

In a second example, a group-by operator (e.g., 206-1) may receive uncompressed input data as follows:

TABLE 5

| year | quarter | month | day | sale |
|------|---------|-------|-----|------|
| Y1   | Q1      | M1    | D1  | 10   |
| Y2   | Q1      | M2    | D1  | 10   |
| Y2   | Q3      | M7    | D2  | 20   |
| Y2   | Q3      | M8    | D2  | 20   |
| Y3   | Q2      | M4    | D3  | 30   |
| Y3   | Q2      | M5    | D3  | 30   |
| Y3   | Q4      | M10   | D4  | 40   |
| Y4   | Q4      | M11   | D4  | 40   |

The group-by operator (206-1) monitors the frequencies of distinct values at the base level (year, quarter, month and day) and determines that frequencies of rows having the same distinct values at the base level are low. Consequently, the group-by operator (206) simply sends the eight rows in TABLE 5 to its corresponding rollup distributor (208-1).

Second Stage

While receiving input rows from a corresponding group-by operator, each of a plurality of rollup distributor processes (e.g., 208-1 through 208-4) is configured to perform several tasks.

Monitor NDV Statistics

One task of a rollup distributor process (e.g., 208-1) is to gather/monitor a plurality of numbers of distinct values (or NDV statistics) for a plurality of candidate data distribution keys. The plurality of candidate data distribution keys corresponds to a plurality of different rollup levels. In the present example, the rollup process is configured to gather/monitor a number of distinct values for each of the candidate data distribution keys as follows for the example query: (a) year; (b) year and quarter; (c) year, quarter and month; and (d) year, quarter, month and day. In some embodiments, the NDV statistics are gathered for all the levels of the rollup operations specified in the database statement, no matter how many group-by columns are specified in the database statement. In some other embodiments, the NDV statistics are gathered for up to a configurable number (e.g. 5, 10, 15, etc.) of group-by columns specified in the database statement to avoid over-monitoring cost. The configurable number of group-by columns may be set manually, by system, by default, etc.

For example, the rollup distributor process (208-1) may receive input data as shown in TABLE 5. Accordingly, the rollup distributor process (208) determines that the candidate data distribution keys of (a) year; (b) year and quarter; (c) year, quarter and month; and (d) year, quarter, month and day, have respective NDVs of (a) 4; (b) 6; (c) 8; and (d) 8.

Monitor Skewedness of Input Data

Additionally or optionally, another task of a rollup process (e.g., 208-1) is to gather/monitor frequencies of distinct hash values produced by a hash function for every candidate data distribution key for which the rollup distributor process (208-1) gathers/monitors NDV statistics. In non-limiting example embodiments, the maximum number of available distinct hash values produced by the hash function can be selected as the same as the degree of parallelism (DOP) or another type of parallelism parameter.

For the purpose of illustration, a hash function may be used to map distinct values of each candidate key to distinct hash values produced by the hash function up to the number of available distinct hash values.

For example, a hash function may be called to map a distinct value "Y1" of a first candidate key comprising only the "year" column to a first distinct hash value. Similarly, a hash function may be called to map a distinct value—a composite value of "Y1" and "Q1"—of a second candidate key comprising both the "year" column and the "quarter" column to a second distinct hash value. A hash function may also be called to map a distinct value—a composite value of "Y1", "Q1" and "M1"—of a third candidate key comprising the "year" column, the "quarter" column, and the "month" column, to a third distinct hash value. A hash function may be further called to map a distinct value—a composite value of "Y1", "Q1", "M1" and "D1"—of a fourth candidate key comprising the "year" column, the "quarter" column, the "month" column, and the "day" column, to a fourth distinct hash value.

In some embodiments, a hash function as described herein may be successively and recursively called to map distinct values of a plurality of candidate keys to distinct hash values. For example, the same hash function that maps the distinct value "Y1" of the first candidate key comprising only the "year" column to the first distinct hash key may be recursively called to map the distinct value—the composite value of "Y1" and "Q1"—of the second candidate key comprising both the "year" column and the "quarter" column to the second distinct hash value. When the hash function is called to map the distinct value of the second candidate key, the first distinct hash value may be used as a seed value for the hash function. Similarly, when the hash function is called to map the distinct value of the third candidate key, the second distinct hash key may be used as a seed value for the hash function. When the hash function is called to map the distinct value of the fourth candidate key, the third distinct hash key may be used as a seed value for the hash function.

Thus, for each of the candidate data distribution keys, the frequencies of the distinct hash values are computed and recorded. Each distinct hash value mapped for a candidate key corresponds to distributing data sharing that distinct hash value to a rollup collector process in a plurality of rollup collector processes (e.g., 210-1 through 210-4), provided that the candidate key is selected for data distribution among the candidate keys. Accordingly, the frequencies of distinct hash values for a given candidate key provide the knowledge of the number of rows to be distributed to each of the rollup collector processes (210-1 through 210-4).

The rollup distributor may be configured to compute a measure of skewedness in the frequencies of distinct hash values for each of the candidate keys.

Local Key Selection

A further task of a rollup distributor process (e.g., 208-1) is to decide/select a local data distribution key among the candidate keys based on the NDV statistics and the frequencies of distinct hash values for the candidate keys as determined from local input data. In some embodiments, the rollup distributor process (208-1) is configured to select, among all eligible candidate keys that meet the DOP and skewedness requirements, a local data distribution key that comprises the smallest number of columns which has a sufficient NDV values and/or a relatively even distribution of key values, as determined from a computed measure of skewedness in the frequencies of hash values for the data distribution key.

For example, with the input data as shown in TABLE 5, the rollup distributor process (208-1) determines that the NDV for a candidate key comprising only the "year" column is sufficient to meet the DOP requirement (4; or a multiplicative factor 2 times a DOP value 2), but a calculation for the measure of skewedness in the frequencies of distinct hash values for the candidate key indicates that data distribution based on this candidate key is uneven (1 row each for the years "Y1" and "Y4" and 3 rows each for the years "Y2" and "Y3"). Thus, this candidate key is determined as not eligible.

The rollup distributor process (208-1) determines that the next candidate key comprising both the "year" column and the "quarter" column has 6 distinct values, which meets the DOP requirement (4). The rollup distributor process (208-1) also determines that the candidate key comprising both the "year" column and the "quarter" column has a relatively even distribution in the frequencies of distinct hash values. Consequently, the rollup distributor process (208-1) selects a local data distribution key as the candidate key comprising both the "year" column and the "quarter" column among all the candidate keys. The local data distribution key also meets the requirement that it comprises the smallest number of columns among eligible candidate keys, since the candidate key (comprising only the "year" column) with a smaller number of columns has been determined not eligible.

Selection of an Overall Data Distribution Key

Each of the rollup distributors may be configured to monitor its respective local data as received from a corresponding group-by operator and locally select a data distribution key based on the results of such monitoring in parallel with and independently of other rollup distributors.

For example, the rollup distributor processes 208-1 through 208-4 locally select four data distribution keys as follows: (a) the "year" column only; (b) the "year" column and the "quarter" column; (c) the "year" column only; (d) the "year" column and the "quarter" column; respectively.

The rollup distributors send their respective locally selected data distribution keys to a query coordinator process, which in turn selects an overall data distribution key that comprises the smallest number of columns among all the locally selected data distribution keys. However, there could be other strategies in other embodiments (e.g., the global key may be selected as the largest number of all local keys selected respectively by the rollup distributors). In the present example, the overall data distribution key is a data distribution key that comprises both the "year" column and the "quarter" column. The selection of the overall data distribution ensures that all the rollup distributors have the same data distribution key, which provides a sufficient NDV (as determined based at least in part on the DOP) and/or a relatively low skewed distribution of hash values for all the rollup distributors. Additionally, optionally, or alternatively, in some embodiments, the number of available distinct hash values is equal to DOP. The frequency of each distinct hash value for each candidate distribution key can be monitored. Specifically, for each candidate distribution key, the occurrences of each distinct hash value is monitored and sorted by frequency. In addition to the NDV requirement (e.g., sufficient distinct number as compared with the number of available parallel executing processes) for choosing the local distribution key, the hash value frequency requirement can be used to ensure that the maximum of the occurrences of any distinct hash value is not more than a configurable threshold. In some embodiments, the threshold can be calculated by the average occurrence (total number of rows the rollup collectors receive divided by DOP) multiplying a configurable factor. Once a global distribution decision is made, the query coordinator is configured to send, to each of the rollup distributors, information that identifies the global data distribution key. The rollup distributors, after receiving the global distribution key decision from the query coordinator, broadcast a special row to all rollup collectors to notify them of the decision.

For a row that is to be distributed from a rollup distributor, the rollup distributor computes a hash value on the selected distribution key and based on the hash value, decides which collector the row goes to. In some embodiments, optionally, the group-by and distribution keys include a grouping_id column; this grouping_id column is used to distinguish rows belonging to different rollup levels—especially when columns can have NULL values. For example, for two rollup levels comprising a rollup level of (year, quarter) and a rollup level of (year), if the "quarter" column can have nulls, then a row with "year" and "quarter" column values ("Y1", null) can belong to the rollup level of (year, quarter) as well as the rollup level of (year). A grouping_id column value in the row may be used to indicate which rollup level this row belongs to.

For the purpose of illustration only, based on the information received from the query coordinator, each rollup distributor is configured to determine a mapping that maps a given distinct value of the data distribution key to a corresponding rollup collector, as illustrated in the following table:

TABLE 6

| Year | quarter | Target Rollup Collector |
|---|---|---|
| Y1, Y2, Y3, Y4 | Q1 | 210-1 |
| Y1, Y2, Y3, Y4 | Q2 | 210-2 |
| Y1, Y2, Y3, Y4 | Q3 | 210-3 |
| Y1, Y2, Y3, Y4 | Q4 | 210-4 |

Row Transfer and Partition of Rollup Operations

Once the (overall) data distribution key is selected for all the rollup distributors and thus a mapping (e.g., TABLE 6) is established between distinct values of the data distribution key and the rollup collectors, each of the rollup distributors may initiate transferring rows received from a corresponding group-by operator to the plurality of rollup collectors (210-1 through 210-4). The rows received from the corresponding group-by operator up to this point may have been buffered at the rollup collector.

For example, a rollup distributor (e.g., 208-1) that receives the input data as shown in TABLE 5 may transfer different rows in the input data to different rollup collectors (e.g., 210-1 through 210-4) based on distinct values of the data distribution key comprising the "year" column and "quarter" column as determined from the column values of these different rows. The first two rows of TABLE 5 are distributed to rollup collector (210-1). The next two rows of TABLE 5 are distributed to rollup collector (210-3). The fifth and sixth rows of TABLE 5 are distributed to rollup collector (210-2). The last two rows of TABLE 5 are distributed to rollup collector (210-4).

Subtotals are calculated for different rollup levels. The base level is the group by level at which a subtotal represents a sum of a grouping column (e.g., the "sale" column in the example "sales" table) for a distinct combination of values of all the group-by columns. The level above the base level is a rollup level at which a subtotal represents a sum of the grouping column for a distinct combination of values of all the group-by columns minus the lowest level rollup column. The level two levels above the base level is a rollup level at which a subtotal represents a sum of the grouping column for a distinct combination of values of all the group-by columns minus the two lowest level rollup column. This continues until all the rollup columns are exhausted or until the level at which a grand total is calculated for the grouping column.

Each of the rollup distributors calculates rollup subtotals based on its respective input data (or buffered rows after receiving from a corresponding group-by operator) for all the levels higher than and equal to the level represented by the list of columns in the overall data distribution key. In the present example, the level represented by the list of columns in the overall data distribution key is that of the "year" column and the "quarter" column. Thus, subtotals at two levels corresponding to (a) "year" and (b) "year and quarter" are locally calculated by each of the rollup distributors based on its respective input data. With the input data as illustrated in TABLE 5, a rollup distributor (e.g., 208-1) obtains subtotals for the two levels of (a) "year" and (b) "year and quarter" as shown in the following table:

TABLE 7

| Year | quarter | Sale | data distribution key value | target rollup collectors |
|---|---|---|---|---|
| Y1 | Q1 | 10 | "Y1" + "Q1" | 210-1 |
| Y1 | null | 10 | "Y1" + null | One of 210-1 through 210-4, e.g., 210-1 |
| Y2 | Q1 | 10 | "Y2" + "Q1" | 210-1 |
| Y2 | Q3 | 40 | "Y2" + "Q3" | 210-3 |
| Y2 | null | 50 | "Y2" + null | One of 210-1 through 210-4, e.g., 210-2 |
| Y3 | Q2 | 60 | "Y3" + "Q2" | 210-2 |
| Y3 | Q4 | 40 | "Y3" + "Q4" | 210-4 |
| Y3 | null | 100 | "Y3" + null | One of 210-1 through 210-4, e.g., 210-3 |
| Y4 | Q4 | 40 | "Y4" + "Q4" | 210-4 |
| Y4 | null | 40 | "Y4" + null | 210-4 |

As can be seen above, a subtotal 50 for the "year" column with a distinct value "Y2" is computed.

Hash values can be computed with the hash function based on data distribution key values (e.g., under the column heading "data distribution key value" as illustrated in TABLE 7) of generated rows that store the subtotals. Based on the computed hash values, the generated rows are distributed to target rollup collectors (e.g., as illustrated in TABLE 7).

Similarly, hash values can be computed with the hash function based on values of columns of the data distribution key in buffered rows that hold the input data from a group-by operator. The buffered rows are distributed to the target rollup collectors based on the hash values. For example, the input rows as illustrated in TABLE 5 are distributed to the target rollup collectors as shown in the following table:

TABLE 8

| Year | quarter | month | day | sale | target rollup collector |
|---|---|---|---|---|---|
| Y1 | Q1 | M1 | D1 | 10 | 210-1 |
| Y2 | Q1 | M2 | D1 | 10 | 210-1 |
| Y2 | Q3 | M7 | D2 | 20 | 210-3 |
| Y2 | Q3 | M8 | D2 | 20 | 210-3 |
| Y3 | Q2 | M4 | D3 | 30 | 210-2 |
| Y3 | Q2 | M5 | D3 | 30 | 210-2 |
| Y3 | Q4 | M10 | D4 | 40 | 210-4 |
| Y4 | Q4 | M11 | D4 | 40 | 210-4 |

Since the data distribution key value of a generated row that stores a subtotal is derived from values of columns of the data distribution key in corresponding buffered rows, the generated row (e.g., the first row of TABLE 7) and the corresponding buffered rows (the first row of TABLE 5 or 8) that are used to compute the subtotal stored in the generated row are distributed to the same target rollup collector.

The above operations performed by one rollup distributor (e.g., 208-1) based on a subset of input data as shown in TABLE 5 may be similarly performed by other rollup distributors (e.g., 208-2 through 208-4) based on other respective subsets of input data. For the purpose of illustration, a second rollup distributor (e.g., 208-2) receives from its corresponding group-by operator (206-2) a second subset of input data as shown in the following table:

TABLE 9

| Year | quarter | month | day | Sale |
|---|---|---|---|---|
| Y1 | Q1 | M1 | D1 | 10 |
| Y1 | Q1 | M2 | D1 | 10 |
| Y1 | Q3 | M7 | D2 | 20 |
| Y2 | Q3 | M8 | D2 | 20 |
| Y3 | Q2 | M4 | D3 | 30 |
| Y4 | Q2 | M5 | D3 | 30 |
| Y4 | Q4 | M10 | D4 | 40 |
| Y4 | Q4 | M11 | D4 | 40 |

With the input data as illustrated in TABLE 9, the second rollup distributor (208-2) obtains subtotals for the two levels of (a) "year" and (b) "year and quarter" as shown in the following table:

TABLE 10

| Year | quarter | Sale | data distribution key value | target rollup collector |
|---|---|---|---|---|
| Y1 | Q1 | 20 | "Y1" + "Q1" | 210-1 |
| Y1 | Q3 | 20 | "Y1" + "Q3" | 210-3 |
| Y1 | Null | 40 | "Y1" + null | One of 210-1 through 210-4, e.g., 210-3 |
| Y2 | Q3 | 20 | "Y2" + "Q3" | 210-3 |
| Y2 | Null | 20 | "Y2" + null | 210-3 |
| Y3 | Q2 | 30 | "Y3" + "Q2" | 210-2 |
| Y3 | Null | 30 | "Y3" + null | 210-2 |
| Y4 | Q2 | 30 | "Y3" + "Q2" | 210-2 |
| Y4 | Q4 | 80 | "Y4" + "Q4" | 210-4 |

TABLE 10-continued

| Year | quarter | Sale | data distribution key value | target rollup collector |
|---|---|---|---|---|
| Y4 | Null | 110 | "Y4" + null | One of 210-1 through 210-4, e.g., 210-4 |

As can be seen above, a subtotal 110 for the "year" column with a distinct value "Y4" is computed.

Hash values can be computed with the hash function based on data distribution key values (e.g., under the column heading "data distribution key value" as illustrated in TABLE 10) of generated rows that store the subtotals. Based on the computed hash values, the generated rows are distributed to target rollup collectors (e.g., as illustrated in TABLE 10).

Similarly, hash values can be computed with the hash function based on values of columns of the data distribution key in buffered rows that hold the input data from a group-by operator. The buffered rows are distributed to the target rollup collectors based on the hash values. For example, the input rows as illustrated in TABLE 9 are distributed to the target rollup collectors as shown in the following table:

TABLE 11

| Year | Quarter | month | day | Sale | target rollup collector |
|---|---|---|---|---|---|
| Y1 | Q1 | M1 | D1 | 10 | 210-1 |
| Y1 | Q1 | M2 | D1 | 10 | 210-1 |
| Y1 | Q3 | M7 | D2 | 20 | 210-3 |
| Y2 | Q3 | M8 | D2 | 20 | 210-3 |
| Y3 | Q2 | M4 | D3 | 30 | 210-2 |
| Y4 | Q2 | M5 | D3 | 30 | 210-2 |
| Y4 | Q4 | M10 | D4 | 40 | 210-4 |
| Y4 | Q4 | M11 | D4 | 40 | 210-4 |

Since the data distribution key value of a generated row that stores a subtotals is derived from values of columns of the data distribution key in corresponding buffered rows, the generated row (e.g., the first row of TABLE 10) and the corresponding buffered rows (the first two rows of TABLE 9 or 11) that are used to compute the subtotal stored in the generated row are distributed to the same target rollup collector.

Third Stage

Each of the rollup collectors (e.g., 210-1 through 210-4) receives buffered rows from the rollup distributors along with high level rollup subtotals. For example, the rollup collector (210-1) receives, from two rollup distributors (e.g., 208-1 and 208-2) with their respective subsets of input data as shown in TABLES 5 and 9, buffered rows as shown in the following table:

TABLE 12

| Year | quarter | month | Day | Sale |
|---|---|---|---|---|
| Y1 | Q1 | M1 | D1 | 10 |
| Y1 | Q1 | M1 | D1 | 10 |
| Y1 | Q1 | M2 | D1 | 10 |
| ... | | | | |

It should be noted that the rollup collector (210-1) may receive, from other rollup distributors (e.g., 208-3 and 208-4) with their respective subsets of input data, other buffered rows (not shown).

The same rollup collector (210-1) receives, from the two rollup distributors (208-1 and 208-2) with their respective subsets of input data as shown in TABLES 5 and 9, high level subtotals as shown in the following table:

TABLE 13

| Year | quarter | Sale |
|------|---------|------|
| Y1 | Q1 | 10 |
| Y1 | null | 10 |
| Y1 | Q1 | 20 |
| Y1 | Null | 40 |
| ... | | |

It should be noted that the rollup collector (210-1) may receive, from other rollup distributors (e.g., 208-3 and 208-4), other high level rollup subtotals (not shown) computed based on the other rollup distributors' respective subsets of input data.

Each of the rollup collectors (e.g., 210-1 through 210-4) perform simple aggregation on the high level rollup subtotals as computed and sent by the rollup distributors (e.g., 208-1 through 208-4). For example, the rollup collector (210-1) performs aggregation on the high levels rollup subtotals, from the two rollup distributors (e.g., 208-1 and 208-2) with their respective subsets of input data as shown in TABLES 5 and 9, to obtain aggregated high level subtotals. Subtotals are aggregated for each combination of distinct values of columns at each of the high levels. Thus, in the present example, all subtotals with a value "Y1" at a rollup level of only the "year" column are aggregated into a first aggregated value by each rollup collector. All subtotals with a value "Y2" at a rollup level of only the "year" column are aggregated into a second aggregated value by each rollup collector. Similarly, all subtotals with a combination of values "Y1" and "Q1" at a rollup level of the "year" column and the "quarter" column are aggregated into a third aggregated value by each rollup collector. All subtotals with a combination of values "Y2" and "Q1" at a rollup level of the "year" column and the "quarter" column are aggregated into a fourth aggregated value by each rollup collector.

Note that if other high level subtotals (not shown in TABLE 13) are received from other rollup distributors (e.g., 208-3 and 208-4), an aggregated subtotal would also include the other high level subtotals. For the purpose of illustration only, for the subtotals as shown in TABLE 13, the rollup collector (210-1) obtains aggregated high level rollup subtotals as shown in the following table:

TABLE 14

| Year | quarter | Sale |
|------|---------|------|
| Y1 | Q1 | 30 |
| Y1 | null | 50 |
| ... | | |

Each of the rollup collectors (e.g., 210-1 through 210-4) computes rollup subtotals at lower levels than the high levels at which partial subtotals have been computed by the rollup distributors. In some embodiments, the rollup subtotals at the lower levels have not been computed (or compressed) by the rollup distributors. It is possible that compression has been performed at the group-by level (or the base level) before a rollup collector receives buffered rows from the rollup distributors. A compressed row would carry a local subtotal (computed based on a subset of input data rather than a complete set of input data) at the base level.

Subtotals are computed for each combination of distinct values of columns at each of the low levels. Thus, in the present example, the "sale" column values of all buffered rows with a combination of values "Y1", "Q1", "M1" and "D1" at a rollup level of the "year", "quarter", "month", and "day" columns are summed up into a fifth subtotal value by the rollup collector (210-1). The "sale" column values of all buffered rows with a combination of values "Y1", "Q2", "M1" and "D1" at the rollup level of the "year", "quarter", "month", and "day" columns are summed up into a sixth subtotal value by the rollup collector (210-2). These and other rollup collectors (210-3 and 210-4) repeat the same summations for their respective distinct combinations of values at the rollup level of the "year", "quarter", "month", and "day" columns.

Similarly, the "sale" column values of all buffered rows with a combination of values "Y1", "Q1", and "M1" at a rollup level of the "year", "quarter", and "month" columns are summed up into a seventh subtotal value by the rollup collector (210-1). The "sale" column values of all buffered rows with a combination of values "Y1", "Q2", and "M1" at the rollup level of the "year", "quarter", and "month" columns are summed up into an eighth subtotal value by the rollup collector (210-2). These and other rollup collectors (210-3 and 210-4) repeat the same summations for their respective distinct combinations of values at the rollup level of the "year", "quarter", and "month" columns.

Note that if other buffered rows (not shown in TABLE 12) are received from other rollup distributors (e.g., 208-3 and 208-4), a subtotal would also include the "sale" column values of the other buffered rows. For the purpose of illustration only, for the buffered rows as shown in TABLE 12, the rollup collector (210-1) obtains low level rollup subtotals as shown in the following table:

TABLE 15

| year | quarter | Month | Day | Sale |
|------|---------|-------|-----|------|
| Y1 | Q1 | M1 | D1 | 20 |
| Y1 | Q1 | M2 | D1 | 10 |
| ... | | | | |

A rollup collector (e.g., 210-1) receives all the rows from all the rollup distributors (208-1 through 208-4) for a distinct data distribution key value. For example, rows with a distinct combination of values "Y1", "Q1", and "M1" at a rollup level of the "year", "quarter", and "month" columns are included in rows with a distinct combination of values "Y1" and "Q1" at the rollup level of a data distribution key comprising the "year" and "quarter" columns but not the "month" column. Therefore, all rows that are needed to compute a lower level (e.g., a rollup level involving rolling up subtotals for a distinct combination of values of the "year", "quarter", and "month" columns) than that of the data distribution key (e.g., comprising the "year" and "quarter" columns but not the "month" column) are received by the rollup collector (210-1). Accordingly, subtotals computed by a rollup collector (e.g., 210-1) are all complete and final.

A rollup collector (e.g., 210-1) receives all buffered rows for a distinct combination of values of columns in the data distribution key. For example, rows with a distinct combination of column values "Y1" and "Q1" at the rollup level of the data distribution key are received by a single rollup collector (e.g., 210-1). Consequently, a high level subtotal after aggregation by a specific rollup collector for a distinct combination of column values at a distinct combination of column values of the data distribution key is complete.

As illustrated, lower rollup levels of (Year, Quarter, Month) and (Year, Quarter, Month, Day) are computed by the rollup collectors from the buffered rows sent from the rollup distributors, while higher rollup levels of (Year) and (Year, Quarter) are partially computed by rollup distributors and are then aggregated for final results by rollup collectors.

Result Set

Partially aggregated high level subtotals (partial to buffered rows received by individual rollup collectors) and low level subtotals (which are complete) are forwarded from all the rollup collectors (e.g., 210-1 through 210) to a query coordinator. Upon receiving these subtotals, the query coordinator aggregates partially aggregated high level subtotals for a distinct combination of values of columns that represent a high level into a complete high level subtotal for the distinct combination of values of the columns. For example, upon receiving the partially aggregated high level subtotals 30 and 20 from the rollup collectors (210-1) and (210-3), the query coordinator aggregates the partially aggregated high level subtotals 30 and 20 into a complete high level subtotal 50 for the distinct value "Y1" at the rollup level corresponding to the "year" column. The query coordinator assembles all complete high level subtotals and all low level subtotals (which are complete as provided by the rollup collectors) into a result set. In the present example, with the input data as shown in TABLES 5 and 9, the query coordinator assembles into a result set comprising generated rows to store complete subtotals at all of the rollup levels as illustrated in the following table:

TABLE 5

| year | quarter | month | day | sale | *notes* |
|---|---|---|---|---|---|
| Y1 | Q1 | M1 | D1 | 20 | Completed by rollup collector 210-1 |
| Y1 | Q1 | M1 | null | 20 | Completed by rollup collector 210-1 |
| Y1 | Q1 | M2 | D1 | 10 | Completed by rollup collector 210-1 |
| Y1 | Q1 | M2 | null | 10 | Completed by rollup collector 210-1 |
| Y1 | Q1 | null | null | 30 | Partially computed by rollup distributors; Completely aggregated by rollup collector 210-1 |
| Y1 | Q3 | M7 | D2 | 20 | Completed by rollup collector 210-1 |
| Y1 | Q3 | M7 | null | 20 | Completed by rollup collector 210-1 |
| Y1 | Q3 | null | null | 20 | Partially computed by rollup distributors; Completely aggregated by rollup collector 210-1 |
| Y1 | null | null | null | 50 | Partially computed by rollup distributors; completed by rollup collectors; |
| Y2 | Q1 | M2 | D1 | 10 | Completed by rollup collector 210-1 |
| Y2 | Q1 | M2 | null | 10 | Completed by rollup collector 210-1 |
| Y2 | Q1 | null | null | 10 | Partially computed by rollup distributors; Completely aggregated by rollup collector 210-1 |
| Y2 | Q3 | M7 | D2 | 20 | Completed by rollup collector 210-3 |
| Y2 | Q3 | M7 | null | 20 | Completed by rollup collector 210-3 |
| Y2 | Q3 | M8 | D2 | 40 | Completed by rollup collector 210-3 |
| Y2 | Q3 | M8 | null | 40 | Completed by rollup collector 210-3 |
| Y2 | Q3 | null | null | 60 | Partially computed by rollup distributors; Completely aggregated by rollup collector 210-3 |
| Y2 | null | null | null | 70 | Partially computed by rollup distributors; completed by rollup collectors; |
| Y3 | Q2 | M4 | D3 | 60 | Completed by rollup collector 210-3 |
| Y3 | Q2 | M4 | Null | 60 | Completed by rollup collector 210-3 |
| Y3 | Q2 | M5 | D3 | 30 | Completed by rollup collector 210-3 |
| Y3 | Q2 | M5 | Null | 30 | Completed by rollup collector 210-3 |
| Y3 | Q2 | null | Null | 90 | Partially computed by rollup distributors; Completely aggregated by rollup collector 210-2 |
| Y3 | Q4 | M10 | D4 | 40 | Completed by rollup collector 210-4 |
| Y3 | Q4 | M10 | null | 40 | Completed by rollup collector 210-4 |
| Y3 | Q4 | null | null | 40 | Partially computed by rollup distributors; Completely aggregated by rollup collector 210-4 |
| Y3 | null | null | null | 130 | Partially computed by rollup distributors; completed by rollup collectors; |
| Y4 | Q2 | M5 | D3 | 30 | Completed by rollup collector 210-2 |
| Y4 | Q2 | M5 | null | 30 | Completed by rollup collector 210-2 |
| Y4 | Q2 | null | null | 30 | Partially computed by rollup distributors; Completely aggregated by rollup collector 210-2 |
| Y4 | Q4 | M10 | D4 | 40 | Completed by rollup collector 210-4 |
| Y4 | Q4 | M10 | null | 40 | Completed by rollup collector 210-4 |
| Y4 | Q4 | M11 | D4 | 80 | Completed by rollup collector 210-4 |
| Y4 | Q4 | M11 | null | 80 | Completed by rollup collector 210-4 |
| Y4 | Q4 | null | null | 120 | Partially computed by rollup distributors; Completely aggregated by rollup collector 210-4 |
| Y4 | null | null | null | 120 | Partially computed by rollup distributors; completed by rollup collectors; |
| null | null | null | null | 370 | Optional, completed by query coordinator |
| ... | | | | | |

For the purpose of illustration only, the number of rollup distributors as shown in FIG. 2C is four. However, a different number of rollup distributors may be selected, for example, based on one or more desired parallelism parameters, the number of available processes, the size of available memory, response time targets, disk spillover avoidance/reduction, etc., at either runtime or before the runtime. For the purpose of illustration only, the number of rollup collectors as shown in FIG. 2C is four. However, a different number of rollup consolidators may be selected, for example, based on one or more desired parallelism parameters, the number of available processes, the size of available memory, response time targets, disk spillover avoidance/reduction, etc., at either runtime or before the runtime. Furthermore, for the purpose of invention, it is not necessary that the number of rollup distributors is the same as the number of rollup collectors.

It has been described that three stages may be used to carry out rollup operations. It should be noted that this is for illustration only. More or fewer stages may be used to carry out rollup operations. For example, consolidation may be performed by one, two or more stages. Results may also be exchanged between parallel executing processes in the same or different stages. For example, once a data distribution key is determined, buffered rows at rollup distributors may be transferred to rollup consolidators without waiting. While some rows are being received, some other rows may be transmitted to the next stage. Operations can be non-blocking with one another to the extent possible.

It has been described that rollup distributors perform relatively high level rollup operations while rollup collectors perform relatively low level rollup operations. It should be noted that other ways of dividing up the rollup operations may be used. For example, rollup collectors may be configured to perform relatively high level rollup operations as well as relatively low level rollup operations. In some embodiments, a part of the high level rollup operations may be performed by the rollup distributors and a part of the same high level rollup operations may be performed by the rollup collectors.

Execution Plan Generation

Figure 1B:
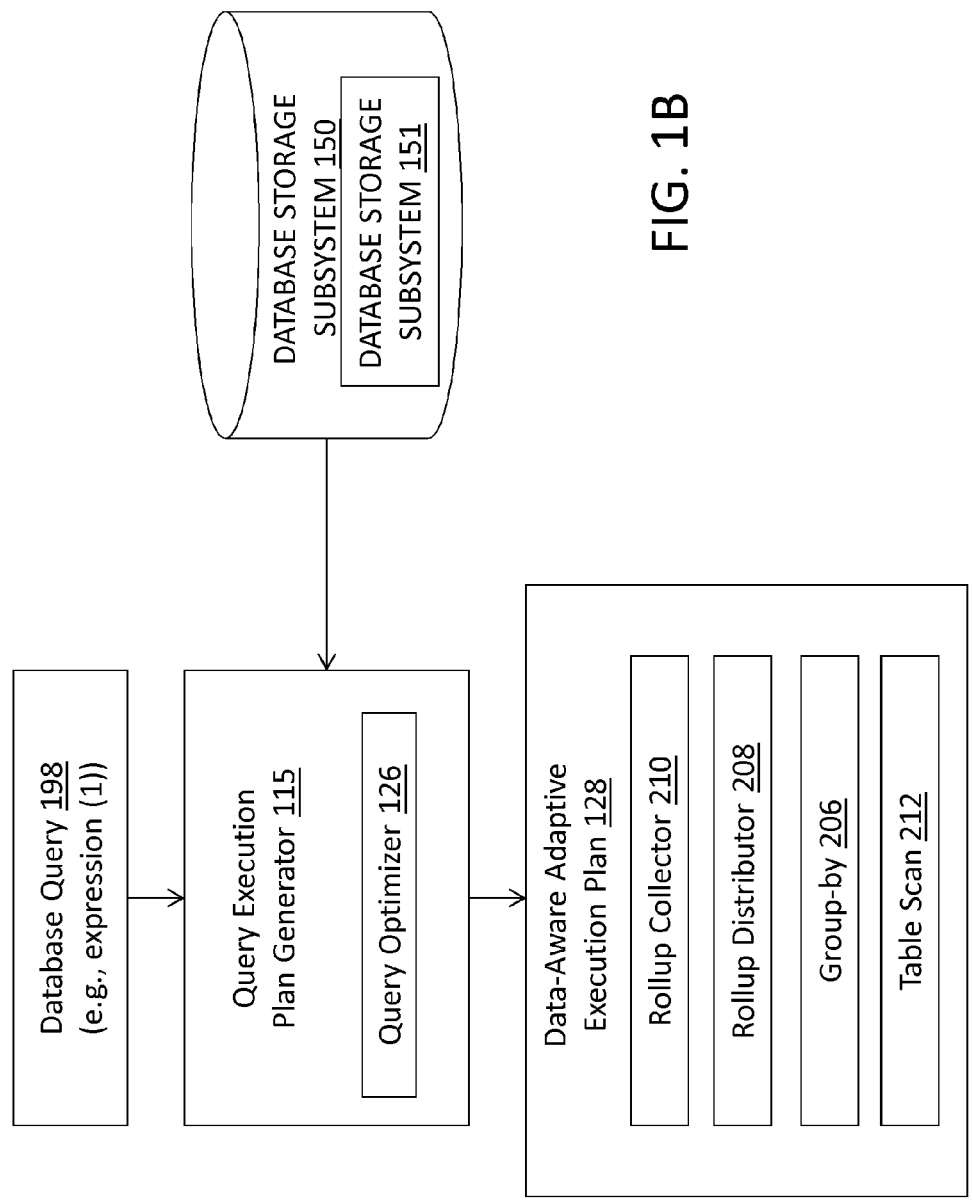
FIG. 1B is a block diagram that depicts the generation of exemplary query execution plans using a query optimizer.

FIG. 1B is a block diagram that depicts the generation of exemplary query execution plans using a query optimizer. FIG. 1B depicts a query execution plan generator 115, a query optimizer 126, a data-aware adaptive execution plan 128, a database storage subsystem 150, and a database statement 198 (e.g., expression (1)). Database storage subsystem 150 includes static query statistics 151. An example execution plan 128 may include TSC operators 212, group-by operators 206, rollup distributor operators 208 and rollup collector operators 210. With respect to FIG. 1B, like numbered elements may correspond to the same elements from FIG. 1A.

In FIG. 1B, a database statement 198, which is a database statement (e.g., expression (1) or (2)) specifying rollup operations, is provided for processing by database system 100 of FIG. 1A. Execution of database statement 198 is carried out on a "sales" table. The "sales" table may be stored in database table 152 of FIG. 1A. Specifically, database statement 198 is structured as a SQL statement. In this manner, a user can retrieve subtotals and even a grand total at various rollup levels.

As shown in FIG. 1B, the database statement 198 is processed through query execution plan generator 115. An intermediate execution plan may result, which is further processed through query optimizer 126. Query optimizer 126 may modify the intermediate execution plan based on database statistics at the compile time or at runtime.

It may be noted that the methods and procedures discussed in the present application are generally applicable for producer operators of any execution plan, regardless of complexity or specific structure. Thus, record sources are not restricted to table scans and could be other operators such as table joins or even other consumer processes or consolidation operators.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
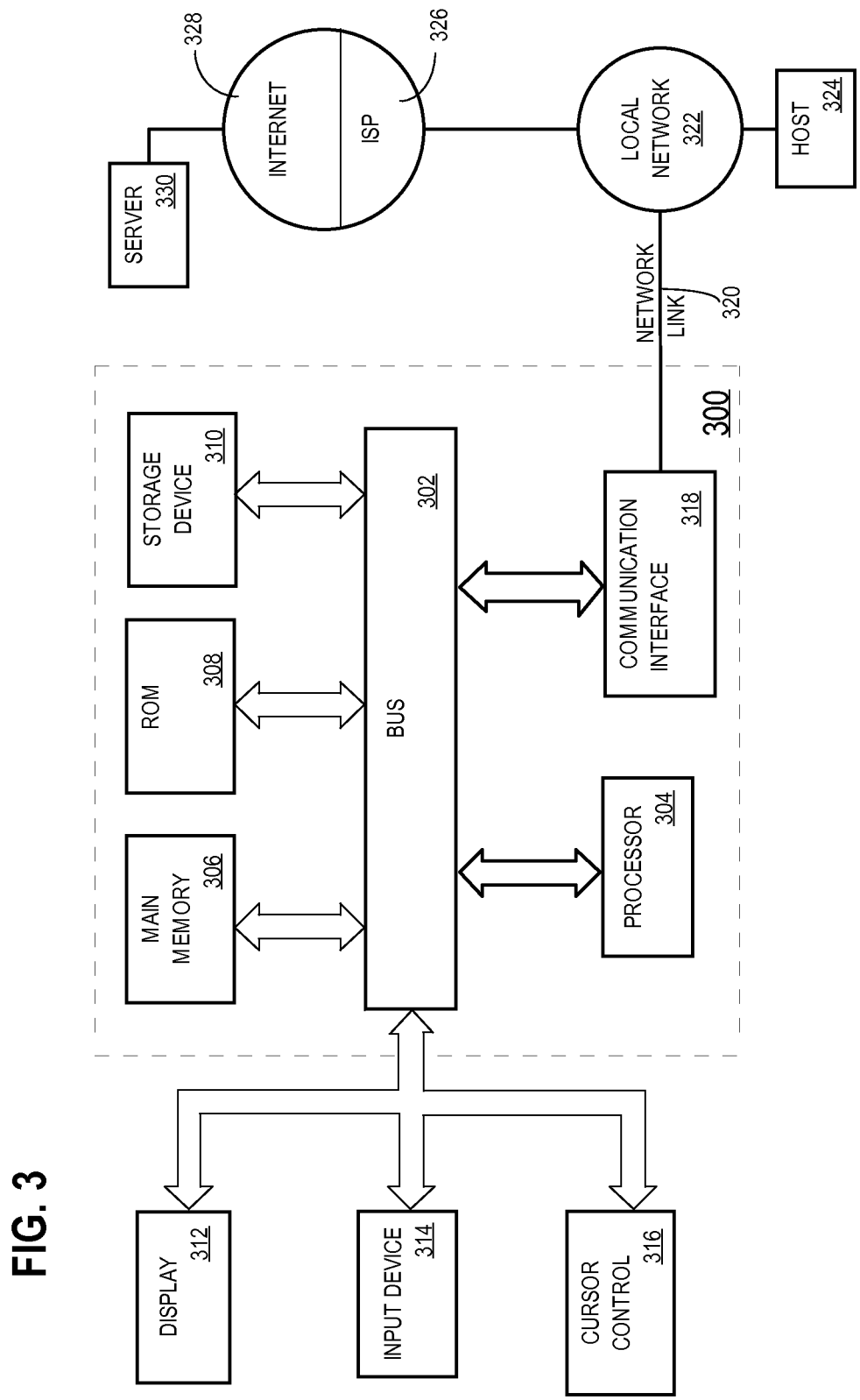
FIG. 3 is a block diagram illustrating a computer system on which embodiments of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   determining a plurality of candidate distribution keys corresponding to a plurality of different rollup levels,
       wherein each candidate distribution key of said plurality of candidate distribution keys comprises one or more group-by columns specified by a database statement that includes a GROUP-BY clause that operates on a set of group-by columns and a ROLLUP keyword that operates on an ordered set of rollup columns selected from the set of group-by columns;
   determining, in a set of rows specified by the database statement, a plurality of numbers of distinct values (NDVs) for the plurality of candidate distribution keys corresponding to the plurality of different rollup levels;
   selecting a distribution key from said plurality of candidate distribution keys based at least in part on the plurality of NDVs for the plurality of candidate distribution keys corresponding to the plurality of different rollup levels;
   distributing the set of rows, based at least in part on the selected distribution key, to a plurality of parallel executing processes comprising first parallel executing processes and second parallel executing processes;
   performing one or more rollup operations specified by the database statement by the plurality of parallel executing processes against the set of rows;
   wherein the method is performed by one or more computing devices.

2. The method of claim 1, wherein the first parallel executing processes are a plurality of rollup distributors, and wherein the second parallel executing processes are a plurality of rollup collectors.

3. The method of claim 1,
wherein the selected distribution key includes at least one column selected from the ordered set of rollup columns,
wherein performing the one or more rollup operations comprises the first parallel executing processes performing a subset of the one or more rollup operations corresponding to one or more subsets of columns of the selected distribution key, and the second parallel executing processes performing any remaining rollup operations of the one or more rollup operations.

4. The method of claim 1, further comprising compressing one or more rows of the set of rows before distributing the set of rows to the plurality of parallel executing processes.

5. The method of claim 1, further comprising:
generating an execution plan for the database statement; and
determining a number of the first parallel executing processes and a number of the second parallel executing processes to be included in said execution plan.

6. The method of claim 1, further comprising:
determining, for said each candidate distribution key of the plurality of candidate distribution keys, frequencies of distinct hashed values generated by applying a hash function to values in the set of rows for columns in said each candidate distribution key;
wherein selecting the distribution key is further based on the frequencies of the distinct hashed values for the plurality of candidate distribution keys.

7. The method of claim 6, wherein distributing the set of rows is further based on the frequencies of the distinct hashed values determined for the selected distribution key.

8. The method of claim 1, wherein determining the plurality of NDVs for the plurality of candidate distribution keys is performed by each of the first parallel executing processes for a respective subset of rows of the set of rows.

9. The method of claim 8, wherein the selected distribution key is selected from a plurality of locally selected distribution keys, and wherein each locally selected distribution key of the plurality of locally selected distribution keys is selected by a parallel executing process of the first parallel executing processes based on the respective subset of rows corresponding to the parallel executing process.

10. The method of claim 1, wherein said one or more rollup operations produce one or more of subtotals or a grand total on a measure column.

11. One or more non-transitory computer-readable media storing one or more sequences of instructions which, when executed by one or more processors, cause performance of:
determining a plurality of candidate distribution keys corresponding to a plurality of different rollup levels,
wherein each candidate distribution key of said plurality of candidate distribution keys comprises one or more group-by columns specified by a database statement that includes a GROUP-BY clause that operates on a set of group-by columns and a ROLLUP keyword that operates on an ordered set of rollup columns selected from the set of group-by columns;
determining, in a set of rows specified by the database statement, a plurality of numbers of distinct values (NDVs) for the plurality of candidate distribution keys corresponding to the plurality of different rollup levels;
selecting a distribution key from said plurality of candidate distribution keys based at least in part on the plurality of NDVs for the plurality of candidate distribution keys corresponding to the plurality of different rollup levels;
distributing the set of rows, based at least in part on the selected distribution key, to a plurality of parallel executing processes comprising first parallel executing processes and second parallel executing processesa;
performing one or one rollup operations specified by the database statement by the plurality of parallel executing processes against the set of rows.

12. The one or more non-transitory computer-readable media of claim 11, wherein the first parallel executing processes are a plurality of rollup distributors, and wherein the second parallel executing processes are a plurality of rollup collectors.

13. The one or more non-transitory computer-readable media of claim 11,
wherein the selected distribution key includes at least one column selected from the ordered set of rollup columns,
wherein the performing the one or more rollup operations comprises the first parallel executing processes performing a subset of the one or more rollup operations corresponding to one or more subsets of columns of the selected distribution key, and the second parallel executing processes performing any remaining rollup operations of the one or more rollup operations.

14. The one or more non-transitory computer-readable media of claim 11, wherein the one or more sequences of instructions include instructions that cause performance of compressing one or more rows of the set of rows distributing the set of rows to the plurality of parallel executing processes.

15. The one or more non-transitory computer-readable media of claim 11, wherein the one or more sequences of instructions include instructions that cause performance of:
generating an execution plan for the database statement; and
determining a number of the first parallel executing processes and a number of the second parallel executing processes to be included in said execution plan.

16. The one or more non-transitory computer-readable media of claim 11, wherein the one or more sequences of instructions include instructions that cause performance of:
determining, for said each candidate distribution key of the plurality of candidate distribution keys, frequencies of distinct hashed values generated by applying a hash function to values in the set of rows for of columns in said each candidate distribution key;
wherein selecting the distribution key is further based on the frequencies of the distinct hashed values for the plurality of candidate distribution keys.

17. The one or more non-transitory computer-readable media of claim 16, wherein distributing the set of rows is further based on frequencies of the distinct hashed values determined for the selected distribution key.

18. The one or more non-transitory computer-readable media of claim 11, wherein determining the plurality of NDVs for the plurality of candidate distribution keys is performed by each of the first parallel executing processes for a respective subset of rows of the set of rows.

19. The one or more non-transitory computer-readable media of claim 18, wherein the selected distribution key is selected from a plurality of locally selected distribution keys, and wherein each locally selected distribution key of the plurality of locally selected distribution keys is selected by a parallel executing process of the first parallel executing processes based on the respective subset of rows corresponding to the parallel executing process.

20. The one or more non-transitory computer-readable media of claim 11, wherein said one or more rollup operations produce one or more of subtotals or a grand total on a measure column.

* * * * *

UNITED STATES PATENT AND TRADEMARK OFFICE
CERTIFICATE OF CORRECTION

| | | |
|---|---|---|
| PATENT NO. | : 9,235,621 B2 | Page 1 of 1 |
| APPLICATION NO. | : 13/754770 | |
| DATED | : January 12, 2016 | |
| INVENTOR(S) | : Liang et al. | |

It is certified that error appears in the above-identified patent and that said Letters Patent is hereby corrected as shown below:

In the specification,

In column 9, line 58, delete "input" and insert -- input data as follows: --, therefor.

In the claims,

In column 26, line 2, in claim 11, delete "processesa;" and insert -- processes; --, therefor.

Signed and Sealed this
Twenty-third Day of August, 2016

Michelle K. Lee
*Director of the United States Patent and Trademark Office*